(12) United States Patent
Niglas et al.

(10) Patent No.: US 10,131,336 B2
(45) Date of Patent: Nov. 20, 2018

(54) SYSTEM AND METHOD FOR BRAKING A VEHICLE

(71) Applicant: BENDIX COMMERCIAL VEHICLE SYSTEMS LLC, Elyria, OH (US)

(72) Inventors: Paul C. Niglas, Avon, OH (US); Michael D. Tober, Avon, OH (US); David W. Howell, Oak Ridge, NC (US); Gerhard Wieder, Besigheim (DE); Adnan Mustapha, Zaisersweiher (DE); Friedbert Roether, Cleebronn (DE)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 114 days.

(21) Appl. No.: 15/275,914

(22) Filed: Sep. 26, 2016

(65) Prior Publication Data

US 2018/0086324 A1     Mar. 29, 2018

(51) Int. Cl.
*B60T 15/02* (2006.01)
*B60T 8/26* (2006.01)
(Continued)

(52) U.S. Cl.
CPC .............. *B60T 15/027* (2013.01); *B60T 8/26* (2013.01); *B60T 8/263* (2013.01); *B60T 8/327* (2013.01); *B60T 13/662* (2013.01); *B60T 13/683* (2013.01)

(58) Field of Classification Search
CPC ...... B60T 15/027; B60T 7/042; B60T 8/1708; B60T 13/36; B60T 13/683; B60T 15/045;
(Continued)

(56) References Cited

U.S. PATENT DOCUMENTS

| 4,585,278 A | 4/1986 | Grauel et al. |
| 4,603,919 A * | 8/1986 | Grauel ..................... B60T 15/20 303/15 |

(Continued)

FOREIGN PATENT DOCUMENTS

| EP | 0146769 A2 | 7/1985 |
| EP | 0869045 A2 | 10/1998 |

(Continued)

OTHER PUBLICATIONS

International Search Report for counterpart International Application PCT/US2017/052912, dated Feb. 1, 2018 (5 pages).

(Continued)

*Primary Examiner* — Thomas J Williams
*Assistant Examiner* — Mariano Sy
(74) *Attorney, Agent, or Firm* — Brian E. Kondas; Cheryl L. Greenly; Eugene E. Clair

(57) ABSTRACT

A valve includes at least one of an electrical port adapted to receive an electronic control signal and a pneumatic control port adapted to receive a pneumatic control signal. The valve also includes a pneumatic delivery port. The pneumatic delivery port is adapted to transmit a pneumatic fluid, based on the at least one of the received electronic control signal and the received pneumatic control signal, from a second independent source to control i) a second associated service brake and ii) delivery of the pneumatic fluid from a first independent source to control a first associated service brake.

36 Claims, 2 Drawing Sheets

(51) Int. Cl.
*B60T 8/32* (2006.01)
*B60T 13/66* (2006.01)
*B60T 13/68* (2006.01)

(58) Field of Classification Search
CPC . B60T 8/26; B60T 8/263; B60T 8/327; B60T 13/662
USPC .................................. 303/127, 118.1, 15
See application file for complete search history.

(56) References Cited

U.S. PATENT DOCUMENTS

| | | | | |
|---|---|---|---|---|
| 4,616,881 A * | 10/1986 | Muller | ................ | B60T 8/00 303/118.1 |
| 5,409,303 A * | 4/1995 | Engelbert | ............ | B60T 8/1708 188/170 |
| 5,624,163 A * | 4/1997 | Kiel | ................ | B60T 8/00 303/13 |
| 5,718,486 A * | 2/1998 | Vollmer | ............ | B60T 8/00 303/15 |
| 5,902,019 A | 5/1999 | Maron et al. | | |
| 6,116,280 A * | 9/2000 | Goodell | ............ | B60T 8/361 137/102 |
| 6,644,758 B1 * | 11/2003 | Stumpe | ............ | B60T 8/327 303/9.66 |
| 6,655,750 B2 * | 12/2003 | Soupal | ............ | B60T 13/268 137/269 |
| 6,659,244 B2 | 12/2003 | Goodell | | |
| 6,702,400 B1 * | 3/2004 | Eberling | ............ | B60T 7/12 303/6.1 |
| 6,758,298 B2 | 7/2004 | Eberling et al. | | |
| 6,953,228 B2 | 10/2005 | Leske et al. | | |
| 7,216,941 B2 * | 5/2007 | Thomas | ............ | B60T 13/38 303/7 |
| 7,309,111 B2 | 12/2007 | Herges et al. | | |
| 7,520,572 B2 | 4/2009 | Hatipoglu et al. | | |
| 8,290,679 B2 * | 10/2012 | Bensch | ............ | B60T 7/20 188/3 H |
| 8,783,791 B2 | 7/2014 | Eberling et al. | | |
| 8,979,217 B2 * | 3/2015 | Steinberger | ............ | B60T 8/327 303/15 |
| 9,315,179 B2 * | 4/2016 | Herges | ............ | B60T 8/1766 |
| 9,758,140 B2 * | 9/2017 | Eberling | ............ | B60T 11/326 |
| 2008/0021623 A1 | 1/2008 | Frey et al. | | |
| 2008/0030068 A1 * | 2/2008 | Bensch | ............ | B60T 7/20 303/17 |
| 2009/0256416 A1 * | 10/2009 | Bensch | ............ | B60T 13/683 303/17 |
| 2009/0280959 A1 * | 11/2009 | Bensch | ............ | B60T 8/1708 477/198 |
| 2010/0078988 A1 * | 4/2010 | Bensch | ............ | B60T 13/683 303/3 |
| 2012/0319464 A1 * | 12/2012 | Lloyd | ............ | B60T 1/10 303/3 |
| 2013/0085649 A1 * | 4/2013 | Matoy | ............ | B60T 8/1708 701/70 |
| 2013/0151105 A1 | 6/2013 | Eberling et al. | | |
| 2016/0152222 A1 * | 6/2016 | Lenz | ............ | B60T 8/5006 303/127 |

FOREIGN PATENT DOCUMENTS

GB 2270130 A 3/1994
WO 2005100115 A1 10/2005

OTHER PUBLICATIONS

Written Opinion of the International Searching Authority for counterpart International Application PCT/US2017/052912, dated Feb. 1, 2018 (6 pages).

* cited by examiner

SYSTEM AND METHOD FOR BRAKING A VEHICLE

BACKGROUND

The present invention relates to controlling a vehicle braking system. It finds particular application in conjunction with achieving braking balance for service brakes in independent pneumatic systems on the vehicle and will be described with particular reference thereto. It will be appreciated, however, that the invention is also amenable to other applications.

"Brake balance" refers to pressurized fluid flowing through a vehicle pneumatic brake system to all brake actuators such that when an operator (e.g., driver) of the vehicle depresses a brake pedal to create a pneumatic brake control signal (e.g., pneumatic initiated braking), the amount of work done by each brake is balanced across the vehicle and across both primary and secondary pneumatic braking circuits. For system initiated braking (e.g., electronic initiated braking used as part of adaptive cruise control, roll stability, and traction control systems) using current technology, the primary and secondary brake circuits are activated separately. Therefore, brake balance is not currently achieved with system initiated braking.

The present invention provides a new and improved apparatus and method which addresses the above-referenced problems.

SUMMARY

In one aspect of the present invention, it is contemplated that a valve includes at least one of an electrical port adapted to receive an electronic control signal and a pneumatic control port adapted to receive an operator initiated pneumatic control signal. The valve also includes a pneumatic delivery port. The pneumatic delivery port is adapted to transmit a pneumatic fluid, based on at least one of the received electronic control signal and the received pneumatic control signal, from a second independent source to control i) a second associated service brake and ii) delivery of the pneumatic fluid from a first independent source to control a first associated service brake.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
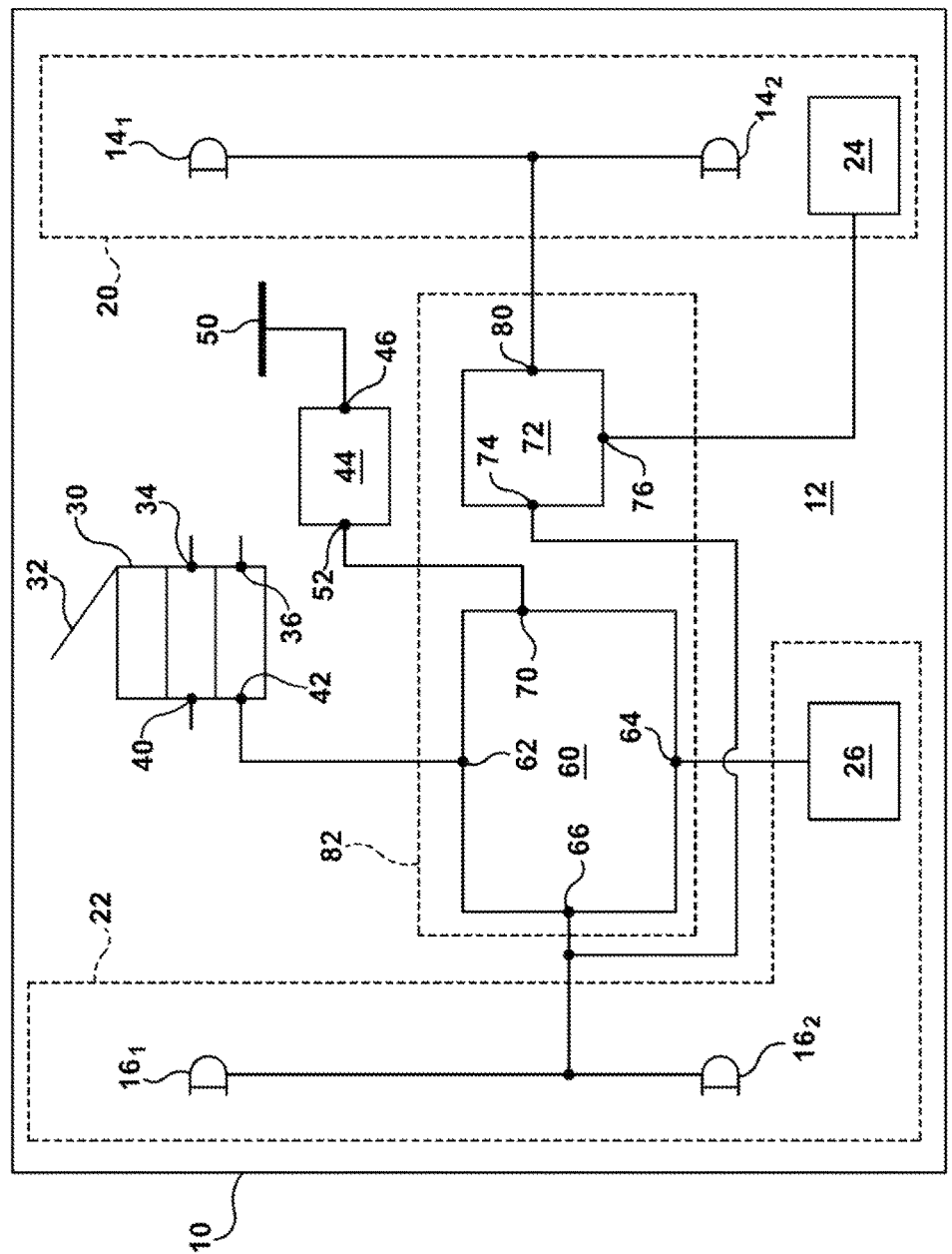
FIG. 1 illustrates a schematic representation of a vehicle including a braking control system in accordance with one embodiment of an apparatus illustrating principles of the present invention.

With reference to FIG. 1, a simplified component diagram illustrating a vehicle 10 including an exemplary braking system 12 in accordance with one embodiment of the present invention. The braking system 12 includes at least one first service brake 14 and at least one second service brake 16. In the illustrated embodiment, there are two (2) first service brakes $14_{1,2}$ (collectively, 14) and two (2) second service brakes $16_{1,2}$ (collectively, 16). The first service brakes 14 are included in a first pneumatic circuit 20, and the second service brakes 16 are included in a second pneumatic circuit 22. It is contemplated that the first pneumatic circuit 20 is pneumatically independent of the second pneumatic circuit 22. The first pneumatic circuit 20 may be referred to as a "primary" pneumatic circuit, and the second pneumatic circuit 22 may be referred to as a "secondary" pneumatic circuit. The first pneumatic circuit 20 may be associated with rear service brakes (e.g., the first service brakes 14), and the second pneumatic circuit 22 may be associated with front service brakes (e.g., the second service brakes 16).

A first reservoir 24 (e.g., tank) is included as part of the first pneumatic circuit 20. A second reservoir 26 (e.g., tank) is included as part of the second pneumatic circuit 22. A pneumatic fluid (e.g., air) is stored in each of the first reservoir 24 and the second reservoir 26. Although it is not illustrated, at least one compressor is used to replenish the pneumatic fluid after it is used from the first reservoir 24 and the second reservoir 26.

A pneumatic brake operator valve 30 includes an actuator 32 (e.g., a foot brake pedal) actuated by an operator of the vehicle 10 when it is desired to decelerate the vehicle 10 and/or maintain the vehicle 10 in a stopped position. The brake operator valve 30 includes pneumatically independent supply ports 34, 36, which fluidly communicate with the first and second reservoirs 24, 26, respectively, and pneumatically independent delivery ports 40, 42, which maintain the pneumatic independence of the first pneumatic circuit 20 and the second pneumatic circuit 22. Respective pressures of the pneumatic fluid communicated from the supply ports 34, 36 to the delivery ports 40, 42 are based on an amount the operator of the vehicle 10 depresses the brake pedal 32 (e.g., an actuation level of the brake pedal 32). For example, in one example, the respective pressures of the pneumatic fluid communicated from the supply ports 34, 36 to the delivery ports 40, 42 are based on (e.g., proportional) the amount the operator of the vehicle 10 depresses (e.g., actuates) the brake pedal 32. The brake operator valve 30 delivers respective pneumatic control signals from the delivery ports 40, 42 when initiated by, for example, the operator of the vehicle 10. The service brakes 14, 16 are actuated based on the respective pneumatic control signals from the delivery ports 40, 42. Since the service brakes 14, 16 are actuated based on the pneumatic control signals, the resulting braking is referred to as pneumatic initiated braking.

An electronic control unit 44 (ECU) is capable of transmitting an electronic control signal when initiated by an automatic braking system on the vehicle 10 to decelerate the vehicle 10 and/or maintain the vehicle 10 in a stopped position (e.g., electronic initiated braking). For example, the ECU 44 includes an electronic input port 46 that receives an electronic signal from the automatic braking system via, for example, a communication bus 50 on the vehicle 10. The ECU 44 also includes an electronic output port 52 that transmits (e.g., delivers) the electronic control signal when initiated by the automatic braking system.

A control valve 60 includes at least one pneumatic control port 62 that fluidly communicates with the delivery ports 40, 42. In the illustrated embodiment, the control value 60 includes a single pneumatic control port 62 that fluidly communicates with one (1) of the delivery ports 40, 42.

More specifically, the pneumatic control port 62 may either fluidly communicate with the primary pneumatic circuit 20 or the secondary pneumatic circuit 22. For example, in the embodiment illustrated in FIG. 1, the pneumatic control port 62 fluidly communicates with the delivery port 42 and, therefore, the reservoir 26 and the secondary pneumatic circuit 22. Other embodiments, in which the pneumatic pressure communicated to the pneumatic control port 62 is based on both of the pneumatic pressures at the delivery ports 40, 42 are also contemplated (e.g., the higher of the pneumatic pressures at the delivery ports 40, 42 is fluidly communicated to the pneumatic control port 62 via, for example, a double-check valve (not illustrated)).

The control valve 60 also includes a pneumatic supply port 64 and a pneumatic delivery port 66. The pneumatic supply port 64 fluidly communicates with one of the reservoirs 24, 26. In the illustrated embodiment, the pneumatic supply port 64 fluidly communicates with the reservoir 26. The pneumatic delivery port 66 fluidly communicates with either the first service brake 14 or the second service brake 16. In the embodiment illustrated in FIG. 1, the pneumatic delivery port 66 fluidly communicates with the second service brake 16.

The control valve 60 also includes an electronic control port 70 that electrically communicates with the electronic output port 52 of the ECU 44. As discussed in more detail below, at least one of the first service brake 14 and the second service brake 16 is controlled based on a first pneumatic pressure at the pneumatic control port 62 and/or an electronic signal at the electronic control port 70.

A relay valve 72 includes a pneumatic control port 74 that fluidly communicates with the delivery port 66 of the control valve 60, a pneumatic supply port 76 that fluidly communicates with the first reservoir 24 or the second reservoir 26, and a pneumatic delivery port 80 that fluidly communicates with the first service brake 14 or the second service brake 16. Since the delivery port 66 of the control valve 60 fluidly communicates with pneumatic control port 74 of the relay valve 72 and the second service brake 16, the delivery port 66 of the control valve 60 is referred to as a common delivery port. As discussed in more detail below, at least one of the first service brake 14 and the second service brake 16 is controlled based on a second pneumatic pressure at the pneumatic control port 74.

It is to be understood that if the delivery port 66 of the control valve 60 fluidly communicates with the second service brake 16, the delivery port 80 of the relay valve 72 fluidly communicates with the first service brake 14 (as illustrated in FIG. 1). Conversely, in another embodiment, if the delivery port 66 of the control valve 60 fluidly communicates with the first service brake 14, the delivery port 80 of the relay valve 72 fluidly communicates with the second service brake 16.

It is to be understood that if the supply port 64 of the control valve 60 fluidly communicates with the second reservoir 26, the supply port 76 of the relay valve 72 fluidly communicates with the first reservoir 24 (as illustrated in FIG. 1). Conversely, in another embodiment, if the supply port 64 of the control valve 60 fluidly communicates with the first reservoir 24, the supply port 76 of the relay valve 72 fluidly communicates with the second reservoir 26.

During pneumatic initiated braking (e.g., when the vehicle operator initiates braking of the vehicle 10 by depressing the brake pedal 32), the brake operator valve 30 delivers the operator initiated pneumatic control signal from the delivery port 42 to the pneumatic control port 62 of the control valve 60. Similarly, during electronic initiated braking (e.g., when the vehicle's automatic braking system initiates braking), the electronic output port 52 of the ECU 44 delivers the electronic control signal to the electronic control port 70 of the control valve 60.

In the illustrated embodiment, the control valve 60 is adapted to transmit the pneumatic fluid, based on at least one of the received operator initiated pneumatic control signal and the received electronic control signal, from the second independent pneumatic source (e.g., the second reservoir 26) to control i) the second service brake 16 and ii) delivery of the pneumatic fluid from the first independent pneumatic source (e.g., the first reservoir 24) to control the first service brake 14. For example, the control valve 60 is adapted to transmit the pneumatic fluid from the reservoir 26 to both of the at least one second service brake 16 and the pneumatic control port 74 of the relay valve 72, via the delivery port 66, when at least one of the operator initiated pneumatic control signal is received at the pneumatic control port 62 and the automatic braking system initiated electronic control signal is received at the electronic control port 70.

If the control valve 60 transmits the pneumatic fluid based on the operator initiated pneumatic control signal received at the pneumatic control port 62, the pneumatic fluid transmitted from the delivery port 66 is based on and, in one embodiment, proportional to, the pressure of the pneumatic fluid at the pneumatic control port 62.

If the control valve 60 transmits the pneumatic fluid based on the system initiated electronic control signal received at the electronic control port 70, the pneumatic fluid transmitted from the delivery port 66 is modulated according to a system braking profile (e.g., according to an adaptive cruise control braking profile, a roll stability braking profile, a traction control braking profile, a collision mitigation braking profile, etc). Consequently, the first service brake 14 and the second service brake 16 are applied according to the system braking profile (e.g., the applications of the first service brake 14 and the second service brake 16 are modulated).

A second pressure of the pneumatic fluid at the delivery port 66, which controls the second service brake 16 and which is transmitted to the pneumatic control port 74 of the relay valve 72, is within a predetermined pressure differential (e.g., between about 2 psi and about 5 psi and, in one example, about 3 psi) of a first pressure of the pneumatic fluid transmitted from the pneumatic delivery port 80 of the relay valve 72 for controlling the first service brake 14 during, for example, a steady-state braking period. Brake balance is achieved between the at least one first service brake 14 and the at least one second service brake 16 while the first pressure is within the predetermined pressure differential of the second pneumatic pressure during, for example, the steady-state braking period. Brake balance refers to the first pressure of the pneumatic fluid controlling the first service brake 14 being within the predetermined pressure differential of the second pressure of the pneumatic fluid controlling the second service brake 16 during the steady-state braking period. The pressure differential is maintained for both pneumatic and electronic initiated braking.

In one embodiment, the first pressure of the pneumatic fluid controlling the first service brake 14 is based on the second pressure of the pneumatic fluid transmitted from the delivery port 66 of the control valve 60 and received at the pneumatic control port 74 of the relay valve 72.

Although the control valve 60 and the relay valve 72 are illustrated as separate devices, it is to be understood other embodiments are contemplated in which the control valve 60 and the relay valve 72 are integrated into a single device 82. The pneumatic control port 62, the pneumatic supply port 64, the delivery port 66, the electronic control port 70, and the delivery port 80 of the single device 82 act as discussed above.

In the embodiments discussed above, the control valve 60 and the relay valve 72 act as a means for controlling and balancing that i) controls application of the first service brake 14 in the first independent pneumatic circuit 20 and application of a second service brake 16 in a second independent pneumatic circuit 22, based on the one of the operator initiated pneumatic control signal received at the pneumatic control port 62 and the electronic control signal received at the electronic control port 70, and ii) balances a first pressure of a pneumatic fluid at the pneumatic delivery port 66 used to apply the first service brake 14 with a second pressure of the pneumatic fluid used to apply the second service brake 16.

Figure 2:
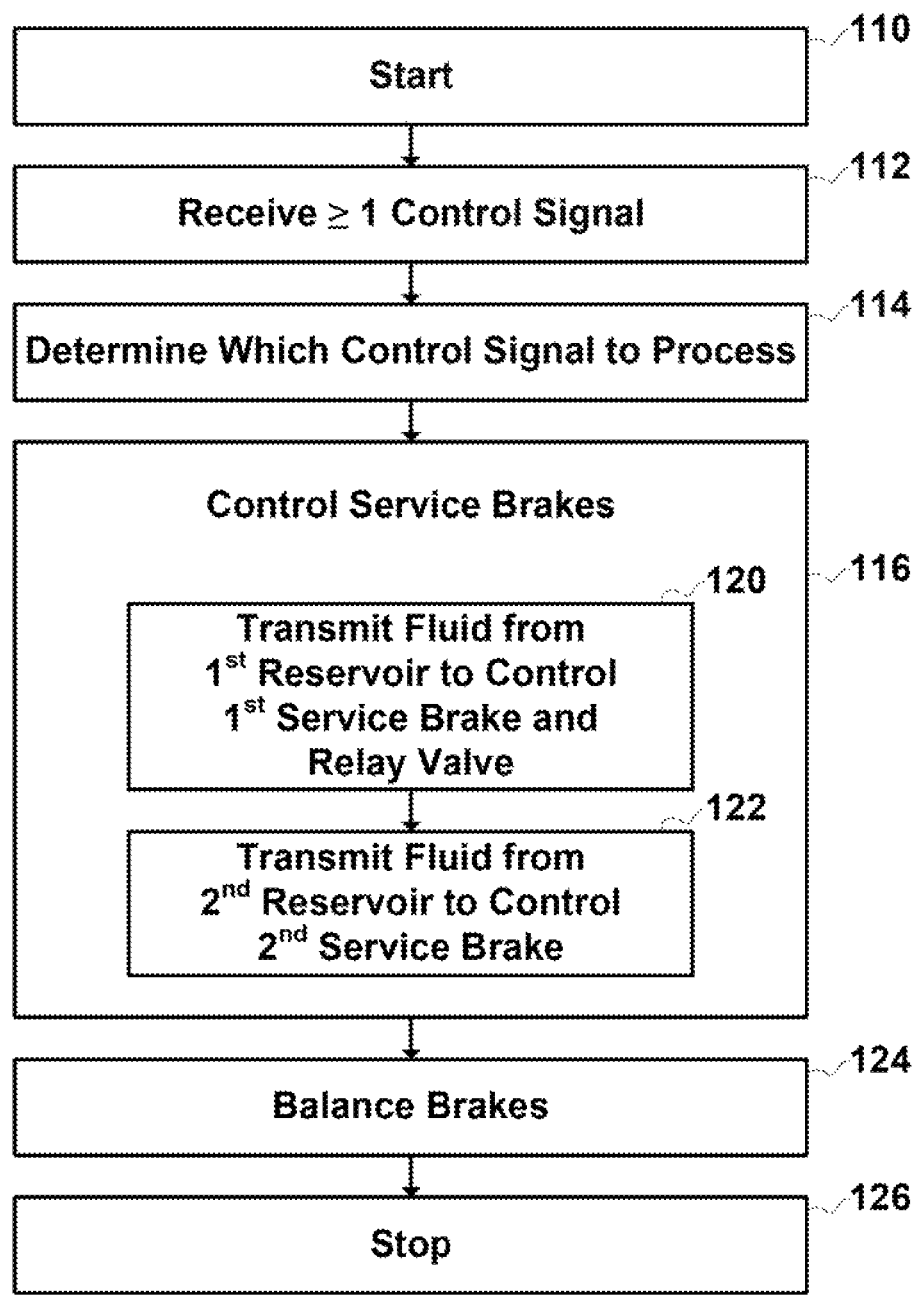
FIG. 2 is an exemplary methodology of braking the vehicle using the braking control system of FIG. 1 in accordance with one embodiment illustrating principles of the present invention.

With reference to FIG. 2, an exemplary methodology of the system shown in FIG. 1 for controlling the braking system 12 of the vehicle 10 is illustrated. As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

With reference to FIGS. 1 and 2, a method for controlling the braking system 12 starts in a step 110. Then, in a step 112, at least one of i) the operator initiated pneumatic control signal of pneumatic fluid is received from the second reservoir 26 of the pneumatic fluid at the valve pneumatic control port 62 and ii) the system initiated electronic control signal is received at the electrical control port 70. A determination is made, in a step 114, which of the at least one of the operator initiated pneumatic control signal and the system initiated electronic control signal to process. For example, in one embodiment, the first signal to be received by the control valve 60 is processed. In another embodiment, if both of the signals are received within a predetermined time (e.g., 0.5 seconds) of each other, the operator initiated pneumatic control signal takes priority over the system initiated electronic control signal.

In a step 116, the first service brake 14 and the second service brake 16 are controlled, based on the control signal selected in the step 114, with the pneumatic fluid from the second reservoir 26 of the pneumatic fluid.

In one embodiment, the step 116 of controlling the first service brake 14 and the second service brake 16 includes applying the second service brake 16 with the pneumatic fluid from the second reservoir 26 and controlling flow of the pneumatic fluid from the first reservoir 24 with the pneumatic fluid from the second reservoir 26 for applying the first service brake 14. For example, the step 116 includes transmitting the pneumatic fluid from the second reservoir 26 via the pneumatic delivery port 66 to control application of the second service brakes 16 and to the pneumatic control port 74 of the relay valve 72, which controls the relay valve 72 and the first service brakes 14, in a step 120. The step 116 also includes transmitting the pneumatic fluid from the first reservoir 24 to control application of the first service brakes 14, via the relay valve 72, in a step 122.

A first pressure of the pneumatic fluid applying the first service brake 14 is within the predetermined pressure differential of the second pressure of the pneumatic fluid applying the second service brake 16 during, for example, the steady-state braking period. In that regard, the first service brake 14 and the second service brake 16 are balanced, in a step 124, during the steady-state period.

The method for controlling the braking system 12 then stops in a step 126.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A valve, comprising:
   at least one of an electrical port adapted to receive an electronic control signal and a pneumatic control port adapted to receive a pneumatic control signal; and
   a pneumatic delivery port adapted to transmit a pneumatic fluid, based on at least one of the received electronic control signal and the received pneumatic control signal, from a second independent source to control i) a second associated service brake and ii) delivery of the pneumatic fluid from a first independent source to control a first associated service brake.

2. The valve as set forth in claim 1, wherein:
   a first pressure of the pneumatic fluid controlling the first associated service brake is within a predetermined pressure differential of a second pressure of the pneumatic fluid controlling the second associated service brake.

3. The valve as set forth in claim 2 wherein:
   the second pressure of the pneumatic fluid controlling the second associated service brake is within the predetermined pressure differential of the first pressure of the pneumatic fluid controlling the first associated service brake during a steady-state braking period.

4. The valve as set forth in claim 3 wherein:
   the second pressure of the pneumatic fluid controlling the second associated service brake is within the predetermined pressure differential of the first pressure of the pneumatic fluid controlling the first associated service brake when the pneumatic delivery port transmits the pneumatic fluid based on both of the received electronic control signal and the received pneumatic control signal.

5. The valve as set forth in claim 3, wherein:
   the first and second pressures cause the first and second associated service brakes, respectively, to be brake balanced with respect to each other during the steady-state braking period.

6. The valve as set forth in claim 1, wherein:
   the first independent source of the pneumatic fluid is associated with a first braking circuit; and
   the second independent source of the pneumatic fluid is associated with a second braking circuit.

7. The valve as set forth in claim 6, wherein:
the first braking circuit is associated with a rear braking circuit of an associated vehicle; and
the second braking circuit is associated with a front braking circuit of the associated vehicle.

8. The valve as set forth in claim 1, wherein:
the pneumatic control signal is an operator initiated pneumatic control signal.

9. A vehicle braking system, comprising:
a pneumatic brake operator valve delivering a pneumatic control signal;
an electronic control unit delivering an electronic control signal;
a valve, comprising:
at least one of a valve pneumatic control port adapted to receive the pneumatic control signal and an electrical port adapted to receive the electronic control signal; and
a valve pneumatic delivery port adapted to transmit a pneumatic fluid, based on at least one of the received pneumatic control signal and the received electronic control signal, from a second independent source to control i) a second associated service brake and ii) delivery of the pneumatic fluid from a first independent source to control a first associated service brake.

10. The vehicle braking system as set forth in claim 9, wherein:
the pneumatic brake operator delivers the pneumatic control signal when an operator of an associated vehicle actuates a pedal of the pneumatic brake operator; and
the electronic control unit delivers the electronic control signal when an automatic braking system of the associated vehicle is initiated.

11. The vehicle braking system as set forth in claim 9, wherein:
a first pressure of the pneumatic fluid controlling the first associated service brake is within a predetermined pressure differential of a second pressure of the pneumatic fluid controlling the second associated service brake.

12. The vehicle braking system as set forth in claim 9, further including:
a relay valve controlling the delivery of the pneumatic fluid from the first independent source to the first associated service brake, the relay valve including:
a relay pneumatic control port fluidly communicating with the valve pneumatic delivery port;
a relay pneumatic supply port fluidly communicating with the first independent source; and
a relay pneumatic delivery port fluidly communicating with the first associated service brake.

13. The vehicle braking system as set forth in claim 12, wherein:
the relay pneumatic control port receives the pneumatic fluid from the valve pneumatic delivery port; and
the relay pneumatic delivery port transmits the pneumatic fluid from the first independent source to the first associated service brake based on a pressure level of the pneumatic fluid at the relay pneumatic control port.

14. The vehicle braking system as set forth in claim 9, wherein:
a first pressure of the pneumatic fluid controlling the first associated service brake is within the predetermined pressure differential of a second pressure of the pneumatic fluid controlling the second associated service brake during a steady-state braking period.

15. The vehicle braking system as set forth in claim 9, wherein:
if the at least one of the received pneumatic control signal and the received electronic control signal is the received pneumatic control signal, the pressure level of the pneumatic fluid at the valve pneumatic delivery port is based on an actuation level of a brake pedal by an operator of an associated vehicle.

16. The vehicle braking system as set forth in claim 9, wherein:
the second independent source of the pneumatic fluid is associated with one of a first braking circuit and a second braking circuit of the associated vehicle; and
the second independent source of the pneumatic fluid is associated with the other of the first braking circuit and the second braking circuit of the associated vehicle.

17. A method for controlling a vehicle braking system, the method comprising:
receiving at least one of i) a pneumatic control signal of pneumatic fluid from a second independent source of the pneumatic fluid at a valve pneumatic control port and ii) an electronic control signal at an electrical port; and
controlling a first service brake and a second service brake, based on the at least one of the pneumatic control signal and the electronic control signal, with the pneumatic fluid from the second independent source of the pneumatic fluid, the controlling step including:
applying the second service brake with the pneumatic fluid from the second independent source; and
applying the first service brake with the pneumatic fluid from a first independent source of the pneumatic fluid.

18. The method for controlling a vehicle braking system as set forth in claim 17, wherein the controlling step includes:
controlling a first pressure of the pneumatic fluid applying the first service brake to be within a predetermined pressure differential of a second pressure of the pneumatic fluid applying the second service brake.

19. The method for controlling a vehicle braking system as set forth in claim 18, wherein the controlling step includes:
controlling the first pressure of the pneumatic fluid applying the first service brake to be within the predetermined pressure differential of the second pressure of the pneumatic fluid applying the second service brake during a steady-state braking period.

20. The method for controlling a vehicle braking system as set forth in claim 17, further including:
balancing the application of the first service brake and the second service brake during a steady-state braking period.

21. The method for controlling a vehicle braking system as set forth in claim 17, further including:
controlling a relay valve with the pneumatic fluid from the second independent source.

22. The method for controlling a vehicle braking system as set forth in claim 21, further including:
transmitting the pneumatic fluid from the first independent source through the relay valve to apply the first service brake.

23. The method for controlling a vehicle braking system as set forth in claim 17, wherein the receiving step includes:

receiving the at least one of i) the pneumatic control signal at a pneumatic control port of a control valve and ii) the electronic control signal at an electrical control port of the control valve.

24. The method for controlling a vehicle braking system as set forth in claim 23, wherein the steps of applying the first service brake and applying the second service brake include:
transmitting the pneumatic fluid from the second independent source to the second service brake and to a control port of a relay valve, which fluidly communicates with the first service brake, via a common delivery port of the control valve.

25. A vehicle braking system, comprising:
a pneumatic brake valve actuator delivering a pneumatic control signal, from a second independent pneumatic circuit, when initiated by an operator of an associated vehicle;
an electronic control unit delivering an electronic control signal when initiated by an automated braking system of the associated vehicle;
means for controlling and balancing that controls application of a second service brake in the second independent pneumatic circuit and application of a first service brake in a first independent pneumatic circuit, based on at least one of the received pneumatic control signal and the received electronic control signal.

26. The vehicle braking system as set forth in claim 25, wherein:
the means for controlling and balancing balances a first pressure of a pneumatic fluid used to apply the first service brake with a second pressure of the pneumatic fluid used to apply the second service brake.

27. The vehicle braking system as set forth in claim 25, wherein:
the means for controlling and balancing balances the first pressure with the second pressure during a steady-state braking period.

28. The vehicle braking system as set forth in claim 25, wherein the means for controlling and balancing includes:
a control valve; and
a relay valve.

29. The vehicle braking system as set forth in claim 28, wherein:
the control valve and the relay valve are separate devices.

30. The vehicle braking system as set forth in claim 28, wherein:
the control valve includes:
a pneumatic control valve control port receiving the operator initiated pneumatic control signal;
an electronic control port receiving the electronic control signal; and
a pneumatic control valve delivery port transmitting the second pressure of the pneumatic fluid to the second service brake and the relay valve; and
the relay valve includes:
a pneumatic relay valve control port receiving the second pressure of the pneumatic fluid; and
a pneumatic relay delivery port transmitting the first pressure of the pneumatic fluid from the first independent pneumatic circuit to the first service brake.

31. A valve, comprising:
at least one of an electrical port adapted to receive an electronic control signal and a pneumatic control port adapted to receive a pneumatic control signal;
a pneumatic delivery port adapted to transmit a pneumatic fluid, based on at least one of the received electronic control signal and the received pneumatic control signal, from a second independent source of the pneumatic fluid to control a second associated service brake;
a relay pneumatic supply port fluidly communicating with a first independent source of the pneumatic fluid; and
a relay pneumatic delivery port adapted to transmit the pneumatic fluid, based on the one of the received electronic control signal and the received pneumatic control signal, from the first independent source to control a first associated service brake.

32. The valve as set forth in claim 31, wherein:
the first independent source of the pneumatic fluid and the first service brake are associated with a first fluidly independent braking circuit; and
the second independent source of the pneumatic fluid and the second service brake are associated with a second fluidly independent braking circuit.

33. The valve as set forth in claim 31, wherein:
if the at least one of the received electronic control signal and the received pneumatic control signal is the pneumatic control signal, the first pressure of the pneumatic fluid and the second pressure of the pneumatic fluid are proportional to a pressure level of the received pneumatic control signal.

34. The valve as set forth in claim 31, wherein:
if the at least one of the received electronic control signal and the received pneumatic control signal is the electronic control signal, the first pressure of the pneumatic fluid and the second pressure of the pneumatic fluid are modulated according to an automatic braking profile.

35. The valve as set forth in claim 31, wherein:
a first pressure of the pneumatic fluid controlling the first associated service brake is within a predetermined pressure differential of a second pressure of the pneumatic fluid controlling the second associated service brake.

36. The valve as set forth in claim 31, wherein:
the first pressure of the pneumatic fluid controlling the first associated service brake is within the predetermined pressure differential of the second pressure of the pneumatic fluid controlling the second associated service brake during a steady-state braking period.

* * * * *